Sept. 12, 1933.  C. W. FOSTER  1,926,519
METHOD OF REGULATING PRESSURE AND APPARATUS THEREFOR
Filed April 13, 1931  2 Sheets-Sheet 1

Inventor
Clarence W. Foster
By
W. E. Currie Attorney

Patented Sept. 12, 1933

1,926,519

UNITED STATES PATENT OFFICE 1,926,519

METHOD OF REGULATING PRESSURE AND APPARATUS THEREFOR

Clarence W. Foster, Elizabeth, N. J., assignor to Standard Oil Development Company, a corporation of Delaware Application April 13, 1931. Serial No. 529,593

10 Claims. (Cl. 261—109)

Figure 1:
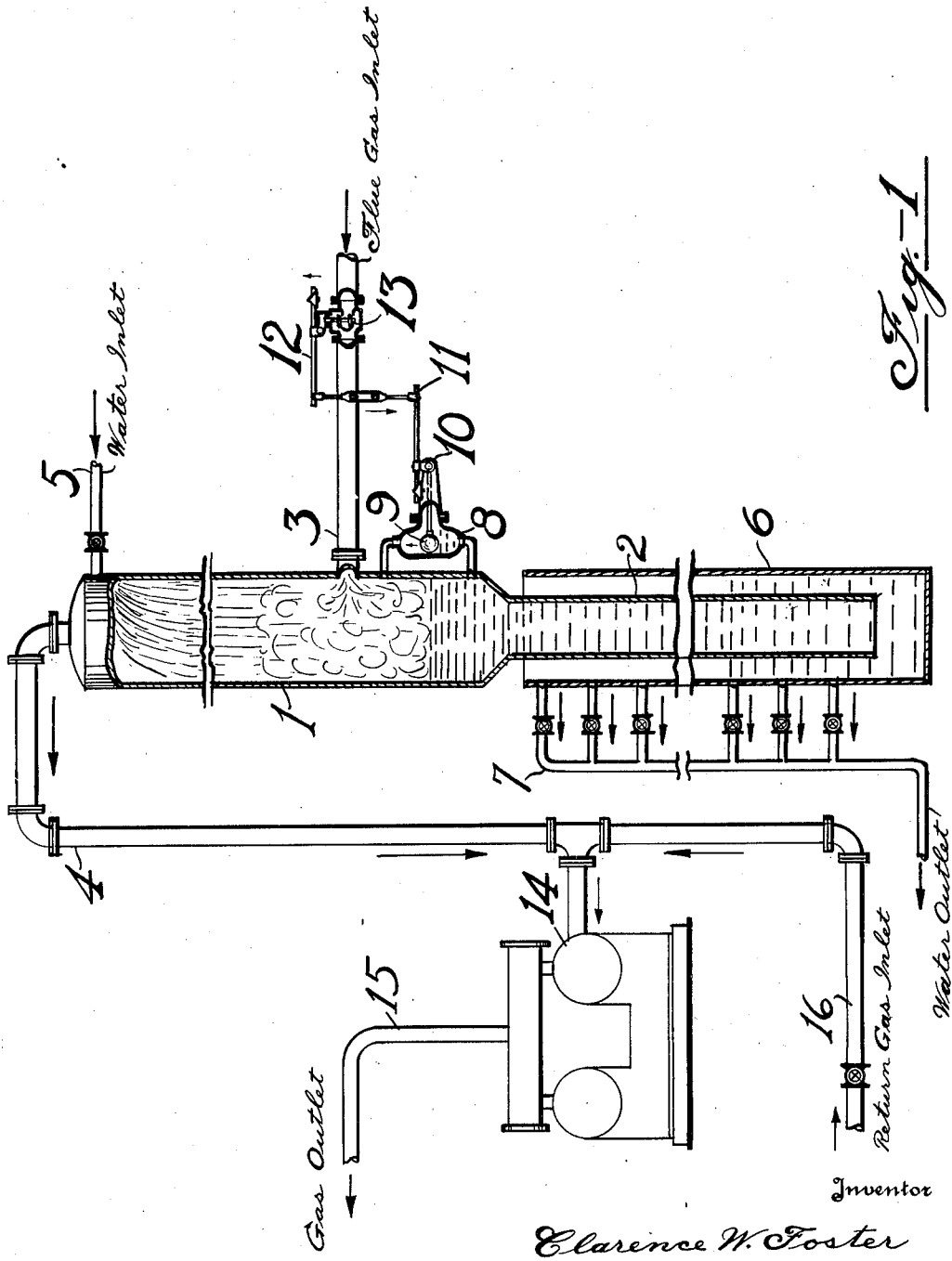
Figure 2:
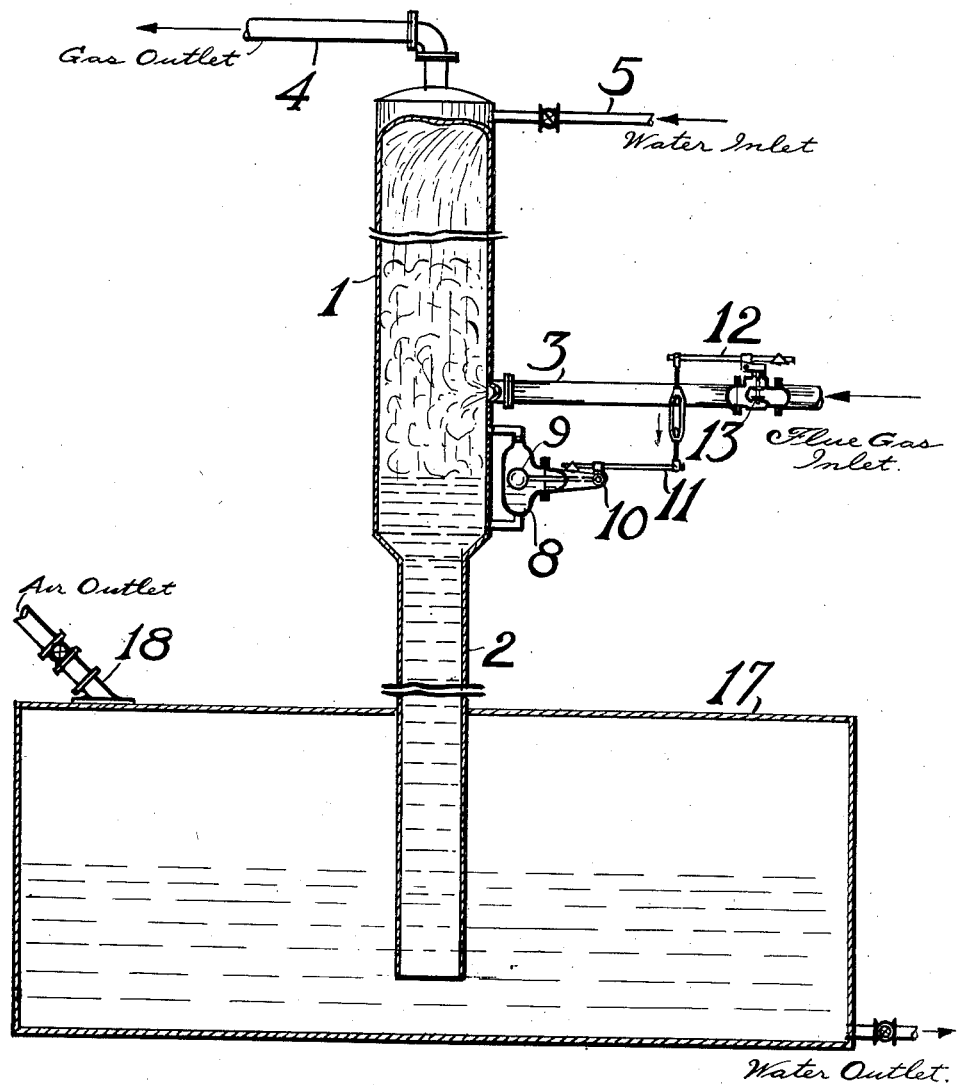

The present invention relates to a method of feeding gas under constant pressure and may be applied with especial advantage to feeding gas under pressure less than atmospheric. The invention also comprises the apparatus. The invention will be fully understood from the following description read in conjunction with the drawings in which:

Fig. 1 is a side elevation partly in section of the apparatus used for feeding gas under pressure less than atmospheric, and Fig. 2 is a similar side elevation partly in section of a modified form of the apparatus which can be used for feeding gas under pressure higher than atmospheric.

The apparatus shown in Fig. 1 will be described in conjunction with its use for the revivification of filter clay. In the known process for refining lubricating oils, the oil is passed through a bed of adsorbent clay. It is necessary to periodically revive the adsorbent clay by removing the adsorbed oil and then burning the clay. Similarly in the contact filtration process for refining lubricating oils, it is necessary to remove the adsorbed oil from the clay before the same is revivified.

The removal of oil from the clay is usually carried out by washing the clay with naphtha and expelling the naphtha remaining in the clay after the washing by means of steam or inert gases such as flue gases.

Describing now the apparatus in more detail:

In Fig. 1 the numeral 1 designates an elongated cylindrical vessel with a similar leg 2 of small cross section. 3 is an inlet line for flue gases coming from a source such as a furnace or flue gas generator (not shown). 4 is a delivery line of the flue gases from vessel 1 to the desired use. The flue gases are washed and cooled in vessel 1 by means of water which is supplied by line 5. The washing has the purpose of cooling the gas and removing and cooling sulphur dioxide to eliminate corrosion in the apparatus. The leg 2 is surrounded by an open vessel 6 of larger diameter, from which the water is removed by a manifold 7 or an equivalent means such as a variable swing pipe. 8 is a float cage. The float 9 is connected through the stuffing box 10 with lever linkage 11 and lever 12 which controls the valve 13 in the gas inlet line 3. Instead of the levers, the control of valve 13 by float 9 may be effected by compressed air or electrical means. 14 is a pump taking suction on line 4 and 15 is a line delivering the gases from the pump to the filter (not shown). The flue gases pass through the filter, remove the gasoline and are freed from the gasoline by washing or absorption. The flue gases may then be returned through line 16 to the pump and recirculated through the filter.

The flue gas is held in vessel 1 under certain vacuum due to the suction of pump 14. The vacuum maintains a certain differential leg of the washing water above the level of the same in the open vessel 6. When the vacuum increases the water in leg 2 rises and the float causes the valve 13 to open further and admit more gas so that the excess vacuum is destroyed. Vice versa, when the vacuum in vessel 1 decreases, the water level in leg 2 descends and the float 9 causes valve 13 to close partially so as to admit less gas and rebuild the vacuum.

Fig. 2 is a form of the apparatus which can be used for the admission of gases under a constant pressure higher than atmospheric. Parts of this apparatus, which are similar to those on Fig. 1, are designated by the identical numerals. Leg 2 of vessel 1 is shown in this figure submerged in a closed vessel 17 of large size. The closed vessel is partly filled with water or other liquid and partly with air under pressure above the water level. Line 18 serves for the admission or removal of air and thus for the regulation of pressure in vessel 17. The size of vessel 17 and the amount of water therein are so large that the water level in it will not be substantially influenced by the variation of water level in vessel 1. Having thus described my invention, I claim:

1. A device for supplying gases under a constant pressure from a place of source to a place of use comprising an elongated supply vessel adapted to contain liquid, a vessel of larger diameter around and in connection with the lower end of the supply vessel, a line for introducing gases from a place of source into the supply vessel, a valve in said line, a float operatively connected with the liquid in said supply vessel on the one side and with said valve on the other side, and a line connecting the supply vessel with the place of use.

2. Apparatus of the class described, comprising a container including a reservoir for liquid and a vessel opening into the reservoir below the normal level of the liquid in the reservoir and extending upwardly to form a gas space, a valved inlet for make-up gas into the vessel, means for drawing variable amounts of the gas under suction from the gas space of the vessel whereby the suction maintains a variable level of liquid in the vessel, and means controlled by the variation in level of the liquid to actuate the valve whereby the amount of make-up gas supplied to the vessel is altered.

3. Apparatus of the class described, comprising a container including a reservoir for liquid and a vessel opening into the reservoir below the normal level of the liquid in the reservoir and extending upwardly to form a gas space, a valved inlet for make-up gas into the vessel, means for drawing variable amounts of gas under suction from the gas space of the vessel whereby the suction maintains a variable level of liquid in the vessel, means for maintaining gas under greater than atmospheric pressure above the liquid in the reservoir, and means controlled by the variation in level of the liquid to actuate the valve whereby the amount of make-up gas supplied to the vessel is altered.

4. Apparatus of the class described, comprising a container including a reservoir for liquid and a vessel opening into the reservoir below the normal level of the liquid in the reservoir and extending upwardly to form a gas space, a valved inlet for make-up gas into the vessel, means for drawing variable amounts of the gas under suction from the gas space of the vessel whereby the suction maintains a variably different level of liquid in the vessel, and means controlled by variation in level of the liquid in the vessel to open the valve upon rise of the liquid level whereby the amount of make-up gas supplied to the vessel is increased.

5. Apparatus of the class described, comprising a container including a reservoir for liquid and a vessel opening into the reservoir below the normal level of the liquid in the reservoir and extending upwardly to form a gas space, a valved inlet for make-up gas into the vessel, means for drawing variable amounts of gas under suction from the gas space of the vessel whereby the suction maintains a variably higher level of liquid in the vessel than in the reservoir, means for changing the volume of liquid in the container whereby the suction pressure at which the gas is admitted is varied, and means controlled by the variation in level of the liquid to actuate the valve whereby the amount of make-up gas supplied to the vessel is altered.

6. Apparatus of the class described, comprising a container including a reservoir for liquid open to the atmosphere and a vessel opening into the reservoir below the normal level of the liquid in the reservoir and extending upwardly to form a gas space, a valved inlet for make-up gas into the vessel, means for drawing variable amounts of gas under less than atmospheric pressure by suction from the gas space of the vessel whereby the suction maintains a variably different level of liquid in the vessel, and means controlled by the variation in level of the liquid in the vessel to actuate the valve whereby the amount of make-up gas supplied to the vessel is altered.

7. Apparatus of the class described, comprising a container including a reservoir for liquid and a vessel opening into the reservoir below the normal level of the liquid in the reservoir and extending upwardly to form a gas space, means for drawing variable amounts of gas under suction from the gas space of the vessel whereby the suction maintains a variably different level of the liquid in the vessel than in the reservoir, a valved inlet for gas into the vessel spaced from the gas outlet, means for supplying the liquid to the vessel between the inlet and outlet whereby the gas is scrubbed, and means controlled by the variation in level of liquid in the vessel to actuate the valve whereby the amount of make-up gas supplied to the vessel is altered.

8. The method of controlling make-up gas for a closed gas system, comprising introducing the make-up gas into a closed zone, maintaining a barometric leg of liquid in communication with the zone, withdrawing varying amounts of gas from the zone under suction whereby the level of the liquid in the leg is varied, and controlling the supply of gas to the zone by means of the liquid level.

9. The method of controlling make-up gas for a closed gas system, comprising introducing the make-up gas into a closed zone, maintaining a barometric leg of liquid under greater than atmospheric pressure in communication with the zone, withdrawing varying amounts of gas from the zone under greater than atmospheric pressure whereby the level of the liquid in the leg is varied, and controlling the supply of gas to the zone by means of the liquid level.

10. The method of controlling make-up gas for a closed gas system, comprising introducing the make-up gas into a closed zone, maintaining the barometric leg of liquid under atmospheric pressure in communication with the zone, withdrawing varying amounts of gas from the zone under less than atmospheric pressure whereby the level of liquid in the leg is varied, and controlling the supply of gas to the zone by means of the liquid level.

CLARENCE W. FOSTER.